United States Patent
Sohn et al.

(10) Patent No.: US 11,205,339 B2
(45) Date of Patent: Dec. 21, 2021

(54) ELECTRONIC DEVICE AND CONTROL METHOD THEREFOR

(71) Applicant: SAMSUNG ELECTRONICS CO., LTD., Suwon-si (KR)

(72) Inventors: Min Shik Sohn, Seoul (KR); Dong Seok Kim, Suwon-si (KR); Sun A Kim, Seoul (KR); Se Hyun Park, Seoul (KR); Ga Eun Lee, Seoul (KR); Ye Nah Lee, Yongin-si (KR); Eun Bi Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 704 days.

(21) Appl. No.: 16/074,378

(22) PCT Filed: Apr. 22, 2016

(86) PCT No.: PCT/KR2016/004247
§ 371 (c)(1),
(2) Date: Jul. 31, 2018

(87) PCT Pub. No.: WO2017/135511
PCT Pub. Date: Aug. 10, 2017

(65) Prior Publication Data
US 2021/0192933 A1 Jun. 24, 2021

(30) Foreign Application Priority Data
Feb. 3, 2016 (KR) .................. 10-2016-0013637

(51) Int. Cl.
*G08C 17/02* (2006.01)

(52) U.S. Cl.
CPC ......... *G08C 17/02* (2013.01); *G08C 2201/30* (2013.01); *G08C 2201/70* (2013.01); *G08C 2201/93* (2013.01)

(58) Field of Classification Search
CPC .............. G08C 17/02; G08C 2201/93; G08C 2201/30; G08C 2201/70
See application file for complete search history.

(56) References Cited

U.S. PATENT DOCUMENTS 7,894,474 B1 * 2/2011 Bell .................. G08C 19/28
370/466
9,374,874 B1 * 6/2016 Ewing .................. G08C 17/02
(Continued)

FOREIGN PATENT DOCUMENTS

KR  10-2010-0028718 A  3/2010
KR  10-2010-0136801 A  12/2010
(Continued)

OTHER PUBLICATIONS

International Search Report (PCT/ISA/210) dated Jan. 9, 2017 issued by the International Searching Authority in International Application No. PCT/KR2016/004247.

*Primary Examiner* — Brian E Miller
(74) *Attorney, Agent, or Firm* — Sughrue Mion, PLLC

(57) ABSTRACT

An electronic apparatus according to the present invention includes: a communicator configured to communicate with a plurality of electronic devices; and a controller configured to determine a second electronic device capable of displaying information of a user interface (UI) for controlling a first electronic device, among the plurality of electronic devices, based on at least one of information about the plurality of electronic devices and information about a user, in response to an event of the user which makes a request for controlling the first electronic device among the plurality of electronic devices, and control the information of the UI to be transmitted to the determined second electronic device.

(Continued)

In such an electronic apparatus, states of a user and peripheral devices are determined to provide a UI optimized to control a device-to-be-controlled, thereby improving user convenience.

20 Claims, 13 Drawing Sheets

(56) References Cited

U.S. PATENT DOCUMENTS

| | | | |
|---|---|---|---|
| 10,045,429 B2* | 8/2018 | Song | G06F 3/04817 |
| 10,063,640 B2* | 8/2018 | Chen | H04L 12/6418 |
| 2003/0025738 A1* | 2/2003 | Polgar | H04N 21/41265 715/835 |
| 2003/0071117 A1* | 4/2003 | Meade, II | H04N 5/4403 235/382.5 |
| 2009/0136231 A1* | 5/2009 | Lai | H04B 10/1143 398/112 |
| 2009/0161027 A1* | 6/2009 | Hardacker | H04N 21/472 348/734 |
| 2010/0325203 A1 | 12/2010 | Park et al. | |
| 2012/0019371 A1* | 1/2012 | Vidal | G08C 17/02 340/12.53 |
| 2012/0086563 A1* | 4/2012 | Arling | G08C 17/02 340/12.52 |
| 2012/0159343 A1 | 6/2012 | Park et al. | |
| 2012/0280802 A1* | 11/2012 | Yoshida | G08C 17/02 340/12.5 |
| 2013/0106738 A1* | 5/2013 | Kim | H04N 21/42208 345/173 |
| 2013/0162412 A1* | 6/2013 | Yu | G08C 17/02 340/12.5 |
| 2014/0111318 A1* | 4/2014 | Arling | H04N 21/42226 340/12.22 |
| 2015/0009020 A1* | 1/2015 | Shekhar | G08C 17/02 340/12.5 |
| 2015/0324078 A1* | 11/2015 | Dipin | G06F 1/163 715/765 |
| 2015/0339917 A1* | 11/2015 | Messing | G08C 17/02 340/12.5 |
| 2015/0347850 A1* | 12/2015 | Berelejis | H04L 67/22 345/633 |
| 2016/0092066 A1* | 3/2016 | Jeon | G06F 3/0484 705/14.66 |
| 2016/0098923 A1* | 4/2016 | Patkar | G08C 23/04 398/106 |
| 2016/0125731 A1* | 5/2016 | McCoy | G08C 17/02 340/12.22 |
| 2016/0142509 A1* | 5/2016 | Shen | G06F 21/305 726/19 |
| 2016/0179068 A1* | 6/2016 | Qian | G05B 19/042 700/275 |
| 2016/0232782 A1* | 8/2016 | Lee | H04W 52/028 |
| 2016/0321915 A1* | 11/2016 | Kahl | H04Q 9/00 |
| 2016/0381143 A1* | 12/2016 | Malik | H04L 12/189 455/518 |
| 2017/0048577 A1* | 2/2017 | Chiou | H04N 21/42204 |
| 2017/0076590 A1* | 3/2017 | Chen | G08C 17/02 |
| 2017/0147077 A1* | 5/2017 | Park | A61B 5/02416 |
| 2017/0180149 A1* | 6/2017 | McConnell | H05B 47/19 |
| 2017/0230511 A1* | 8/2017 | Kim | H04M 11/007 |
| 2017/0308248 A1* | 10/2017 | Choi | G06F 3/0488 |
| 2019/0077003 A1* | 3/2019 | Lennings | B25F 5/00 |
| 2021/0064221 A1* | 3/2021 | Meen | G06F 3/011 |

FOREIGN PATENT DOCUMENTS

| | | |
|---|---|---|
| KR | 10-1108399 B1 | 1/2012 |
| KR | 10-2013-0053185 A | 5/2013 |
| KR | 10-1548228 B1 | 8/2015 |
| KR | 10-1549027 B1 | 9/2015 |
| WO | 2011/025219 A2 | 3/2011 |
| WO | 2014/041623 A1 | 3/2014 |

* cited by examiner

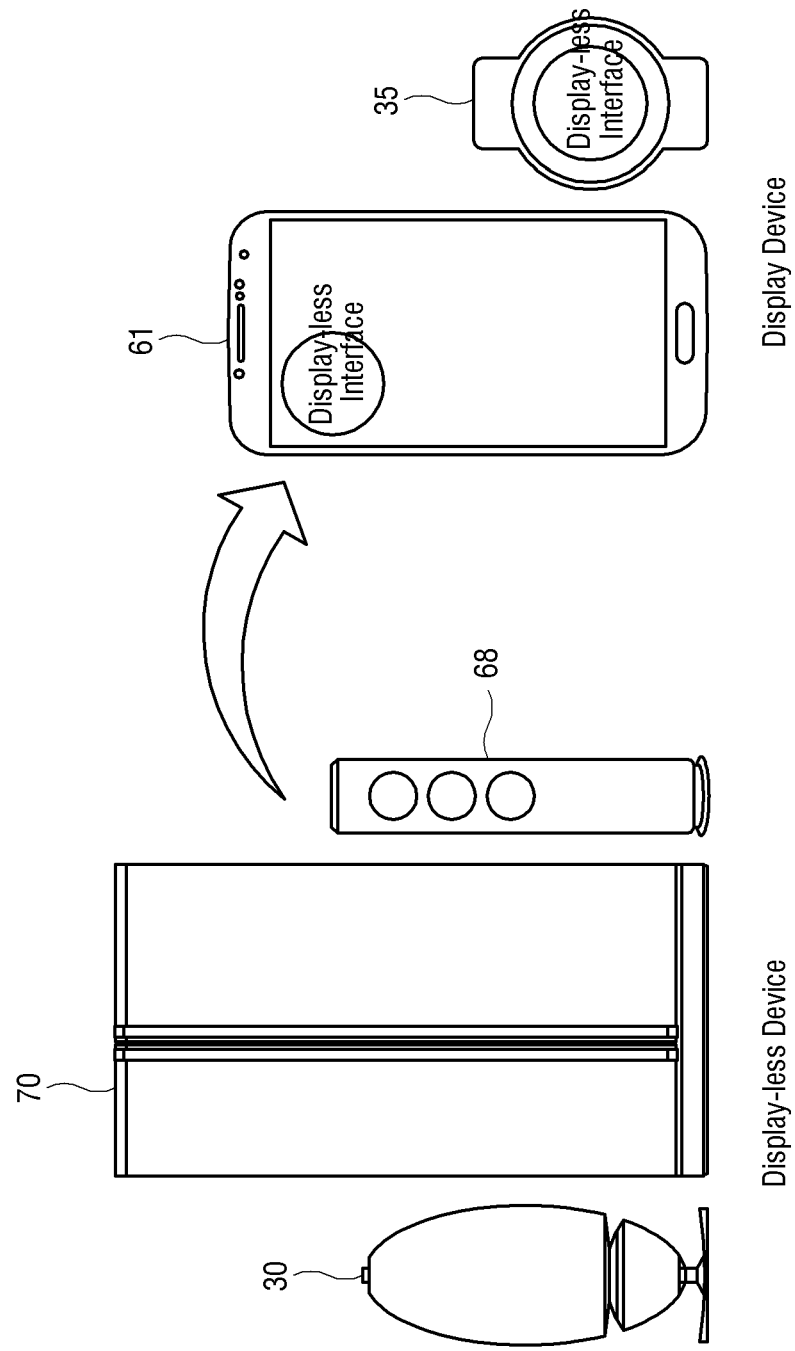

FIG. 10

| INTERFACE \ INFORMATION ATTRIBUTES | SPECIFIC SELECTION VALUE | TEXT | VOICE | IMAGE/VIDEO | HEART RATE | ACCELERATION |
|---|---|---|---|---|---|---|
| FOUR ARROW KEYS | 50 | 40 | 0 | 0 | 0 | 0 |
| TOUCH SCREEN | 100 | 90 | 0 | 0 | 0 | 0 |
| MOUSE | 90 | 50 | 0 | 0 | 0 | 0 |
| KEYBOARD | 40 | 100 | 0 | 0 | 0 | 0 |
| MICROPHONE | 0 | 0 | 100 | 0 | 0 | 0 |
| CAMERA | 0 | 0 | 0 | 100 | 0 | 0 |
| ACCELEROMETER | 0 | 0 | 0 | 0 | 0 | 100 |
| Biometric Sensor | 0 | 0 | 0 | 0 | 100 | 0 |

ELECTRONIC DEVICE AND CONTROL METHOD THEREFOR

TECHNICAL FIELD

The present invention relates to an electronic apparatus and a control method thereof, and more particularly to an electronic apparatus for determining states of a user and peripheral devices and controlling a plurality of devices, and a control method thereof.

BACKGROUND ART

To control various devices under certain environments, a user has to grasp an individual state of each device and perform direct or indirect control in accordance with the devices. Further, it is inefficient since each device is controllable by only a unique application program and interface provided in the device.

When many devices are controlled at a time, batch control is restrictively possible with regard to only a fixedly set function. Thus, it is difficult to deal with situations with regard to what service or function a user currently needs, which control method is the most useful for a user, etc.

In particular, to provide a function desired by a user, there is a need of going through many stages, for example, search, connection, executing of an app, finding of function, control, etc., thereby causing problems that not only usability is decreased but also users who are scared of technology may give up the use. Thus, inefficiency in the use may lead to a drop in value of products and service commodities.

DISCLOSURE

Technical Problem

Accordingly, an object of the present invention is to provide an electronic apparatus for providing a service and interface optimized to states of a user and a peripheral device, and a control method thereof.

Another object of the present invention is to provide an electronic apparatus for controlling a plurality of devices at a time by taking states of a user and a peripheral device into account, and a control method thereof.

Technical Solution

The foregoing objects of the present invention are achieved by providing an electronic apparatus including: a communicator configured to communicate with a plurality of electronic devices; and a controller configured to determine a second electronic device capable of displaying information of a user interface (UI) for controlling a first electronic device, among the plurality of electronic devices, based on at least one of information about the plurality of electronic devices and information about a user, in response to an event of the user which makes a request for controlling the first electronic device among the plurality of electronic devices, and control the information of the UI to be transmitted to the determined second electronic device.

According to such an embodiment of the electronic apparatus, the electronic apparatus determines states of a user and peripheral devices to provide a UI optimized to control a device-to-be-controlled, thereby improving user convenience. Further, the states of the user and peripheral devices are taken into account to control the plurality of devices in a lump.

The controller may determine a control function of the first electronic device based on at least one of the information about the plurality of electronic devices and the information about the user, and generate information of the UI corresponding to the determined control function. Thus, the states of the user and peripheral devices are taken into account to thereby automatically provide the UI for the control function needed for the user.

The controller may give a score in accordance with a matching degree between each of the plurality of electronic devices and the information of the UI, and select a second electronic device, the score of which is equal to or higher than a predetermined level, among the plurality of electronic devices. Thus, in light of providing the UI for controlling the device-to-be-controlled, it is possible to select the device optimized to display information involved in the UI, among the plurality of devices.

The electronic apparatus may further include a storage configured to store information about priority of users over each of the plurality of electronic devices, wherein the controller transmits the information of the UI to each terminal of the first user who generates the event and the second user who has a higher priority than the first user, based on the stored information about the priority of users of the first electronic device, in response to an event of making a request for controlling the first electronic device among the plurality of electronic devices. Thus, the UI is transmitted to each terminal of a user who makes a request for controlling the device-to-be-controlled and another user who has authority to do control, so that a user who can control the UI can directly control the device-to-be-controlled.

The controller may control a program for communication between the first user and the second user to be executed in each terminal of the first user and the second user. Thus, the terminal of the user who makes a request for controlling the device-to-be-controlled and the terminal of another user who has authority to do control can provide a UI for controlling the device-to-be-controlled and the UI for communication between the users.

The event may include a touching input or an aiming input of the user to the first electronic device. Thus, the request for controlling the device-to-be-controlled is made as a user touches or aims at the device-to-be-controlled.

The information about the plurality of electronic devices may include information about whether power is supplied to the plurality of electronic devices and what operation the plurality of electronic devices is performing. Thus, when the request is made for controlling the device-to-be-controlled, the control function instantly needed for a user is determined by grasping whether the peripheral device is powered on or off, what operation the peripheral device is performing, etc.

The information of the UI may include a UI controllable by a user to perform the determined control function. Thus, the UI is configured to control the device-to-be-controlled and provided to a terminal of a user, so that the user can control the device-to-be-controlled through the UI.

The second electronic device may include a portable terminal and a wearable device for the user. Thus, in terms of providing the UI for controlling the device-to-be-controlled, the UI is provided to one among the plurality of display devices usable by the user.

The controller may store information about the plurality of electronic devices corresponding to the event, information about the user of the first electronic device, the determined control function, information of the UI, and information about the second electronic device, and refer to the stored invention when a new event occurs. Thus, the situation determination data, the control function, the UI, the information about the device of transmitting the UI, etc. are stored corresponding to the request for controlling the device-to-be-controlled, and the stored information is used as data for determining the situation in the future.

The foregoing objects of the present invention are achieved by providing a method of controlling an electronic apparatus, the method including: communicating with a plurality of electronic devices; determining a second electronic device capable of displaying information of a user interface (UI) for controlling a first electronic device, among the plurality of electronic devices, based on at least one of information about the plurality of electronic devices and information about a user, in response to an event of the user which makes a request for controlling the first electronic device among the plurality of electronic devices; and transmitting the information of the UI to the determined second electronic device.

According to such an embodiment of the electronic apparatus, the electronic apparatus determines states of a user and peripheral devices to provide a UI optimized to control a device-to-be-controlled, thereby improving user convenience. Further, the states of the user and peripheral devices are taken into account to control the plurality of devices in a lump.

The method may further include: determining a control function of the first electronic device based on at least one of the information about the plurality of electronic devices and the information about the user; and generating information of the UI corresponding to the determined control function. Thus, the states of the user and peripheral devices are taken into account to thereby automatically provide the UI for the control function needed for the user.

The determining of the second electronic device may include: giving a score in accordance with a matching degree between each of the plurality of electronic devices and the information of the UI; and selecting a second electronic device, the score of which is equal to or higher than a predetermined level, among the plurality of electronic devices. Thus, in light of providing the UI for controlling the device-to-be-controlled, it is possible to select the device optimized to display information involved in the UI, among the plurality of devices.

The method may further include: storing information about priority of users over each of the plurality of electronic devices; and transmitting the information of the UI to each terminal of the first user who generates the event and the second user who has a higher priority than the first user, based on the stored information about the priority of users of the first electronic device, in response to an event of making a request for controlling the first electronic device among the plurality of electronic devices. Thus, the UI is transmitted to each terminal of a user who makes a request for controlling the device-to-be-controlled and another user who has authority to do control, so that a user who can control the UI can directly control the device-to-be-controlled.

The method may further include controlling a program for communication between the first user and the second user to be executed in each terminal of the first user and the second user. Thus, the terminal of the user who makes a request for controlling the device-to-be-controlled and the terminal of another user who has authority to do control can provide a UI for controlling the device-to-be-controlled and the UI for communication between the users.

The event may include a touching input or an aiming input of the user to the first electronic device. Thus, the request for controlling the device-to-be-controlled is made as a user touches or aims at the device-to-be-controlled.

The information about the plurality of electronic devices may include information about whether power is supplied to the plurality of electronic devices and what operation the plurality of electronic devices is performing. Thus, when the request is made for controlling the device-to-be-controlled, the control function instantly needed for a user is determined by grasping whether the peripheral device is powered on or off, what operation the peripheral device is performing, etc.

The information of the UI may include a UI controllable by a user to perform the determined control function. Thus, the UI is configured to control the device-to-be-controlled and provided to a terminal of a user, so that the user can control the device-to-be-controlled through the UI.

The second electronic device may include a portable terminal and a wearable device for the user. Thus, in terms of providing the UI for controlling the device-to-be-controlled, the UI is provided to one among the plurality of display devices usable by the user.

The method may further include: storing information about the plurality of electronic devices corresponding to the event, information about the user of the first electronic device, the determined control function, information of the UI, and information about the second electronic device; and referring to the stored invention when a new event occurs. Thus, the situation determination data, the control function, the UI, the information about the device of transmitting the UI, etc. are stored corresponding to the request for controlling the device-to-be-controlled, and the stored information is used as data for determining the situation in the future.

Advantageous Effects

As described above, according to the present invention, an electronic apparatus determines states of a user and a peripheral device and thus provides a UI optimized to control a device-to-be-controlled, thereby having an effect on improving user convenience.

Further, according to the present invention, the electronic apparatus takes states of a user and a peripheral device into account, thereby having an effect on controlling a plurality of devices in a lump.

DESCRIPTION OF DRAWINGS

FIGS. 3 to 8 illustrate examples of providing a UI for performing a control function when a user trigger occurs with regard to a device-to-be-controlled according to one embodiment of the present invention.

FIG. 10 is a table in which suitability between an information attribute and an interface is scored according to one embodiment of the present invention.

BEST MODE

Hereinafter, embodiments of the present invention will be described in detail with reference to accompanying drawings so as to be easily realized by a person having an ordinary skill in the art to which the present invention pertains. The present invention may be embodied in various different forms, and not limited to the embodiments set forth herein. To describe the present invention clearly, parts unrelated to the description are omitted, and the same or like numerals refer to the same or like elements throughout.

Figure 1:
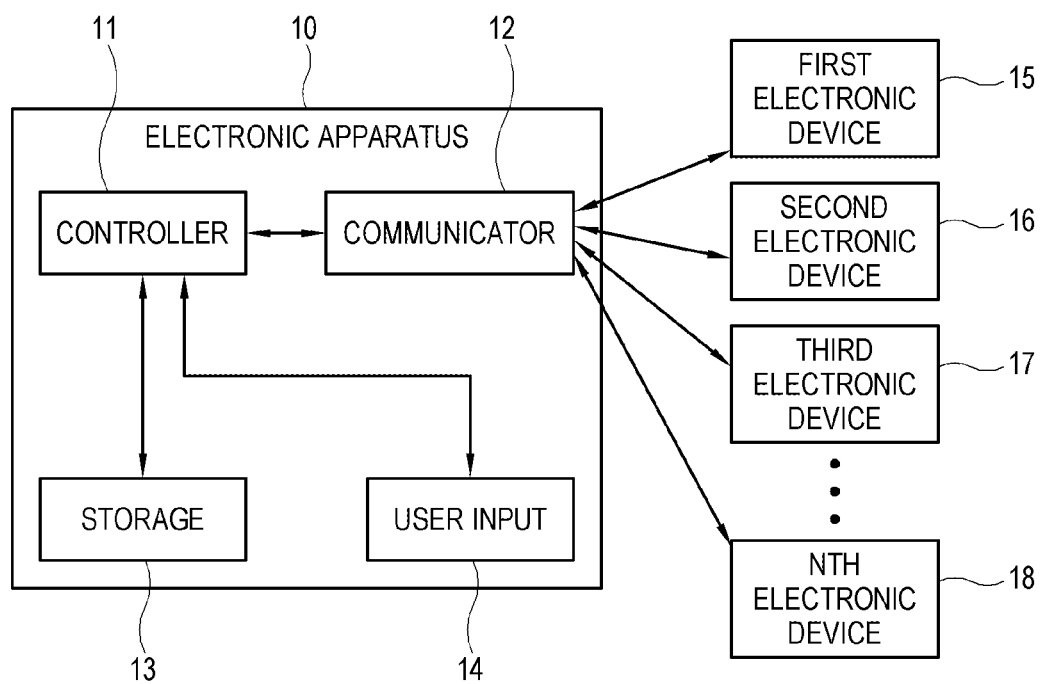
FIG. 1 is a block diagram of an electronic apparatus according to one embodiment of the present invention.

Below, elements of an electronic apparatus according to the present invention will be first described in detail with reference to FIG. 1. FIG. 1 is a block diagram of an electronic apparatus according to one embodiment of the present invention. As shown in FIG. 1, an electronic apparatus 10 according to one embodiment of the present invention includes a controller 11, a communicator 12, a storage 13, and a user input 14, and may be for example materialized by a smart TV, a smart phone, a desktop computer, a notebook or the like display apparatus; or a refrigerator, a refrigerator, an air conditioner or the like home appliance. Alternatively, the electronic apparatus 10 may be materialized by a general commercial server, i.e. a web server; or a home server or home gateway in a home network environment in which information home appliances are connected via a network. Further, the electronic apparatus 10 is not limited to these examples, and may be materialized by various kinds of electronic devices usable in Internet of things (IoT) environments. The elements included in the electronic apparatus 10 according to the present invention are not limited to the foregoing embodiment, and may include other additional elements.

The electronic apparatus 10 is connected to a first electronic device 15, a second electronic device 16, a third electronic device 17 and an Nth electronic device 18 through the communicator 12. The first electronic device 15, the second electronic device 16, the third electronic device 17 and the Nth electronic device 18 may be for example materialized by a smart TV, a smart phone, a desktop computer, a notebook computer, or the like display apparatus; or a refrigerator, an air conditioner, a wireless audio system, a lamp, a washing machine, or the like general home appliance. Alternatively, the electronic apparatus may be materialized by a door lock or the like digital device. Further, the first electronic device 15, the second electronic device 16, the third electronic device 17 and the Nth electronic device 18 are not limited to these examples, and may be materialized by various kinds of electronic devices usable in Internet of things (IoT) environments.

The electronic apparatus 10 communicates with the plurality of electronic devices 15, 16, 17 and 18. The electronic apparatus 10 determines the second electronic device 16 capable of displaying information about a user interface (UI) for controlling the first electronic device 15, based on at least one of information about the plurality of electronic devices 15, 16, 17 and 18 and information about a user, in response to a user's event of making a request for controlling the first electronic device 15 among the plurality of electronic devices 15, 16, 17 and 18. The electronic apparatus 10 transmits the information about the UI to the determined second electronic device 16.

According to such an embodiment of the present invention, the electronic apparatus determines states of a user and a peripheral device and provides a UI optimized to control a device-to-be-controlled, thereby having an effect on improving user convenience. Further, the states of the user and the peripheral device are taken into account, thereby having an effect on controlling the plurality of devices in a lump.

The communicator 12 is capable of communicating with the plurality of electronic devices 15, 16, 17 and 18. For example, the communicator 12 may communicate with the plurality of electronic devices 15, 16, 17 and 18 by Wi-Fi direct, Bluetooth, ZigBee, low power wireless personal area network (6LoWPAN) or the like short-range wireless communication method. When the communicator 12 communicates with the plurality of electronic devices 15, 16, 17 and 18 by Bluetooth, pairing between the communicator 12 and the plurality of electronic devices 15, 16, 17 and 18 may be performed. Alternatively, the communicator 12 may communicate with the plurality of electronic devices 15, 16, 17 and 18 by wireless Internet.

The user input 14 may receive an input from a user. The user input 14 may be provided in the form of an input panel or a button placed on an outer side of the electronic apparatus 10. Further, when the electronic apparatus 10 is materialized by the display apparatus, the user input 14 may be achieved by a touch screen, a keyboard, a mouse, etc. The user input 14 may receive a user's input through a remote controller. A user's input may be made by at least one among button clicking, menu selecting, shortcut-key input, voice command, and motion recognition.

The controller 11 determines the second electronic device 16 capable of displaying information about a UI for controlling the first electronic device 15, based on at least one of information about the plurality of electronic devices 15, 16, 17 and 18 and information about a user, in response to a user's event of making a request for controlling the first electronic device 15 among the plurality of electronic devices 15, 16, 17 and 18. The electronic apparatus 10 transmits information about the UI to the determined second electronic device 16. The second electronic device 16 may include a user's portable terminal, wearable device, etc. For example, the electronic apparatus 10 may transmit the information about the UI to a user's smart phone or smart watch.

Here, the event may include a user's touching input or aiming input with regard to the first electronic device 15. The touching input includes a user's action of touching a target device with a hand, and may be for example based on technology of a proximity sensor, fingerprint recognition, etc. The aiming input includes a user's action of pointing a target device with a hand, and may be for example based on technology of Bluetooth, Bluetooth low energy (BLE), etc.

According to one embodiment, information about the plurality of electronic devices 15, 16, 17 and 18 may include information about whether each of the plurality of electronic devices 15, 16, 17 and 18 is powered on or off and information about operations thereof. That is, the controller 11 makes a request for information about whether each of the plurality of electronic devices 15, 16, 17 and 18 is powered on or off and what operation each device is performing to each device, and receives the information from each device.

Information about a user may include time information (when), place information (where), activity information (what), relationship information (who), cause information (why), method information (how), and the like related to a user at a point of time when the user generates an event.

In detail, the time information (when) related to a user may include information about whether it is a date, a day of the week, time, a weekday or weekend, an anniversary date or a national holiday at the point of time when the event occurs. The place information (where) may include information about a user's location determined by a global positioning system (GPS), a user's indoor position determined by a Beacon, a user's position determined by Wi-Fi, an access point (AP), etc. The activity information (what) may include information about a user's activity mapped to a current place where a user is. For example, when a user is currently at work, it may be determined that the user is now working. Further, the activity information may include a user's activities based on his/her schedule information registered in at least one among the electronic apparatus 10 and the plurality of electronic devices 15, 16, 17 and 18. For example, when a meeting is scheduled for 10:00 AM, it may be determined that a user takes part in the meeting.

The relationship information (who) related to a user may include information about other people associated with the user by a current location and a schedule, closeness with and social distance from a certain person, and relationship with close people based on a user's contact list data. The cause information (why) may include information about a user's activities or a user' states based on the user's schedule information. The method information (how) may include a service necessary for a user analyzed based on the time information (when), the place information (where), the activity information (what), the relationship information (who), and the cause information (why) about the user grasped as described above.

Thus, the controller 11 grasps the information about the plurality of electronic devices 15, 16, 17 and 18 and the information about a user, thereby determining a user's current state and what service a user instantly needs, and determining an interaction method and a device available for providing the necessary service.

Figure 4:
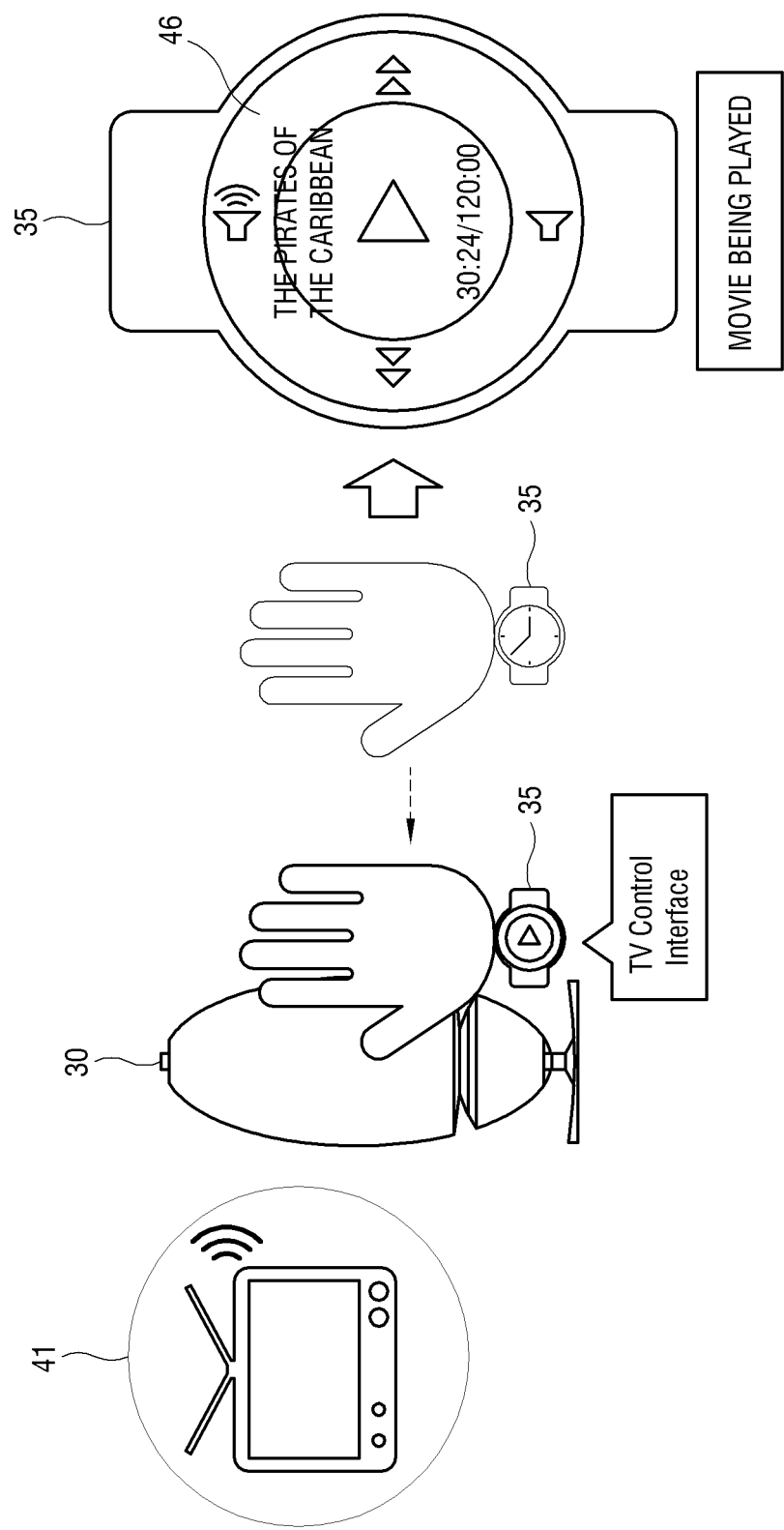

According to one embodiment, the controller 11 may determine a function of controlling the first electronic device 15 based on at least one of information about the plurality of electronic devices 15, 16, 17 and 18 and information and information about a user, and generate information about a UI corresponding to the determined control function. In this case, the information about the UI may include a UI for allowing a user to do control for implementing the determined control function. For example, as shown in FIG. 4, when a user touches a wireless audio system 30 while a TV 41 placed in the vicinity of the wireless audio system 30 is displaying a movie, a UI 46 for controlling the sound of the TV 41 may be provided to a user's smart watch 35.

According to one embodiment, the controller 11 may give a score to each of the plurality of electronic devices 15, 16, 17 and 18 in accordance with a matching degree to the information of the UI, and select the second electronic device, the score of which is equal to or higher than a predetermined level, among the plurality of electronic devices. For example, as shown in FIG. 10, information attributes to be included in the UI may include a specific selection value, a text, a voice, an image, a heart rate, acceleration, etc. It is taken into account whether the interfaces, such as four arrow keys, a touch screen, a mouse, a keyboard, a microphone, a camera, an accelerometer, a biometric sensor, etc. are suitable for receiving inputs of these attributes, and then the scores are given to the interfaces. Thus, among the plurality of electronic devices, the device having the interface of a high score is selected to provide a UI.

According to one embodiment, the electronic apparatus 10 may further include the storage 13 for storing information about priority of users with regard to each of the plurality of electronic devices 15, 16, 17 and 18. For example, the storage 13 may be configured to store identification (ID), terminal information and priority of a plurality of users who will be authorized to use each of the plurality of electronic devices 15, 16, 17 and 18, so that a user who will control each device can be determined based on the stored priority.

Figure 11:
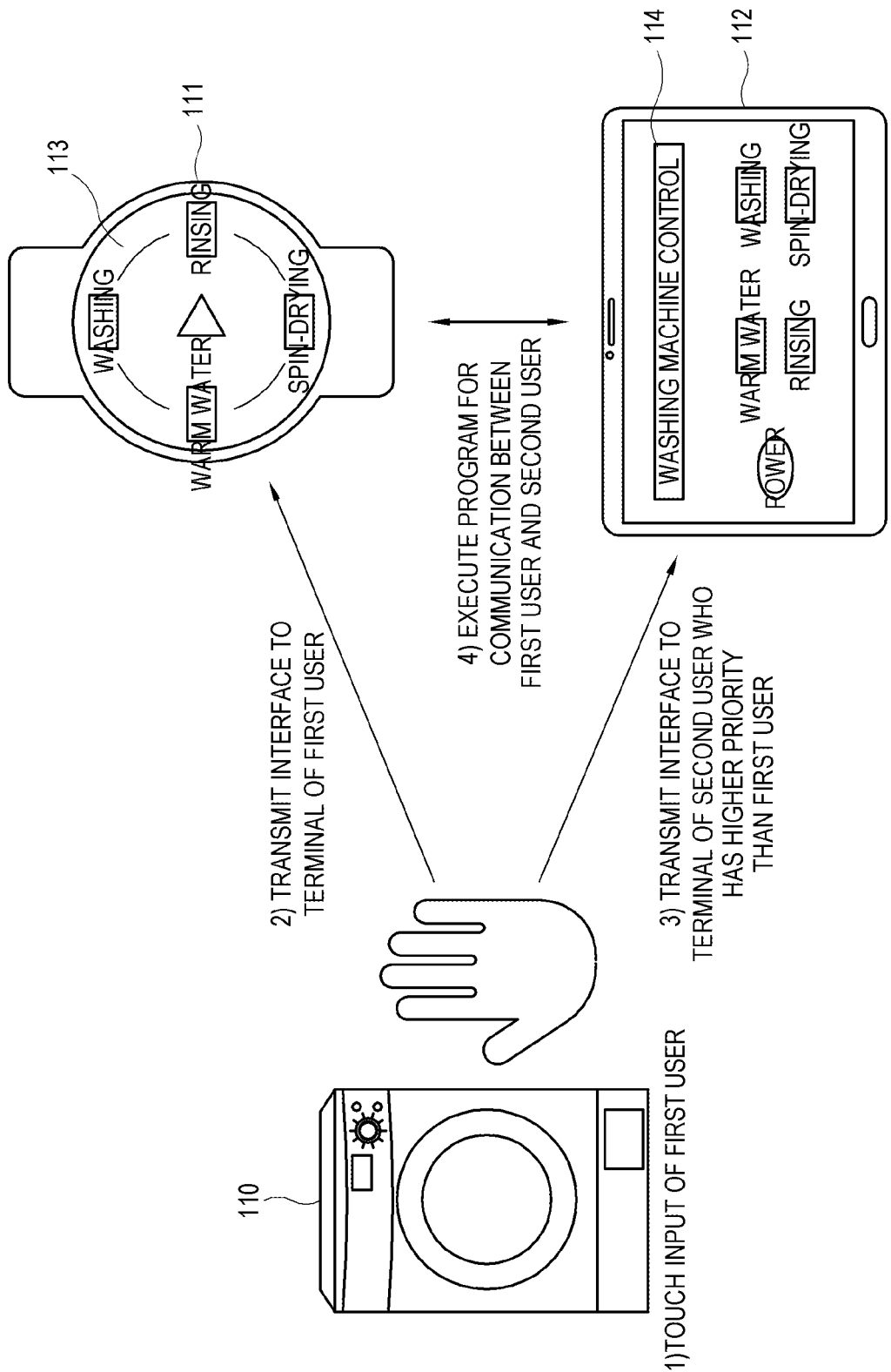
FIG. 11 illustrates an example of providing a UI by taking priority of users into account when a user trigger occurs according to one embodiment of the present invention.

The controller 11 may transmit information about the UI to both a terminal of a first user who generates an event and a terminal of a second user who has a higher priority than the first user, in accordance with priority information of a user of the first electronic device 15 stored in the storage, in response to an event of making a request for control of the first electronic device 15 among the plurality of electronic devices 15, 16, 17 and 18. In this case, each of the terminal of the first user and the terminal of the second user may be one among the second electronic device 16, the third electronic device 17 and the Nth electronic device 18. For example, as shown in FIG. 11, when the first user touches a washing machine 110, the UI for controlling the washing machine 110 may be transmitted to not only a smart watch 111 of the first user but also a tablet computer 112 of the second user who has a higher priority than the first user, based on information about priority over the washing machine 110 stored in the storage 13.

In this case, the controller 11 may control each terminal of the first and second users to execute a program for communication of the first user and the second user. That is, in relation to the control of the UI for controlling the first electronic device 15, a chatting program, a messenger, etc. may be used for communication between the first user and the second user.

According to one embodiment, the controller 11 may store information about the plurality of electronic devices 15, 16, 17 and 18; information about a user of the first electronic device 15; a determined control function; information about a UI; information about the second electronic device 16; etc. in response to an event, and refer to the stored information when a new event occurs. For example, referring to FIG. 4, the controller 11 may store event information such as a user's touch input to the wireless audio system 30; information about a state of the TV 41 that is displaying a movie; information about a control function for controlling the sound of the TV 41; information about the UI 46 for performing the control function; information about a user's smart watch 35 of transmitting the UI 46; etc. Thus, when the same event occurs under similar environmental conditions, the controller 11 can instantly transmit the stored UI 46 to the smart watch 35 of the user with reference to the stored information.

According to one embodiment, the controller 11 may receive and install a control program for performing control from a server or the like external device. Thus, when an event occurs with regard to the first electronic device 15, the controller 11 executes the installed control program and performs control. For example, when the electronic apparatus 10 is materialized by a smart TV or the like, the control program may be achieved by a predetermined application program.

Figure 2:
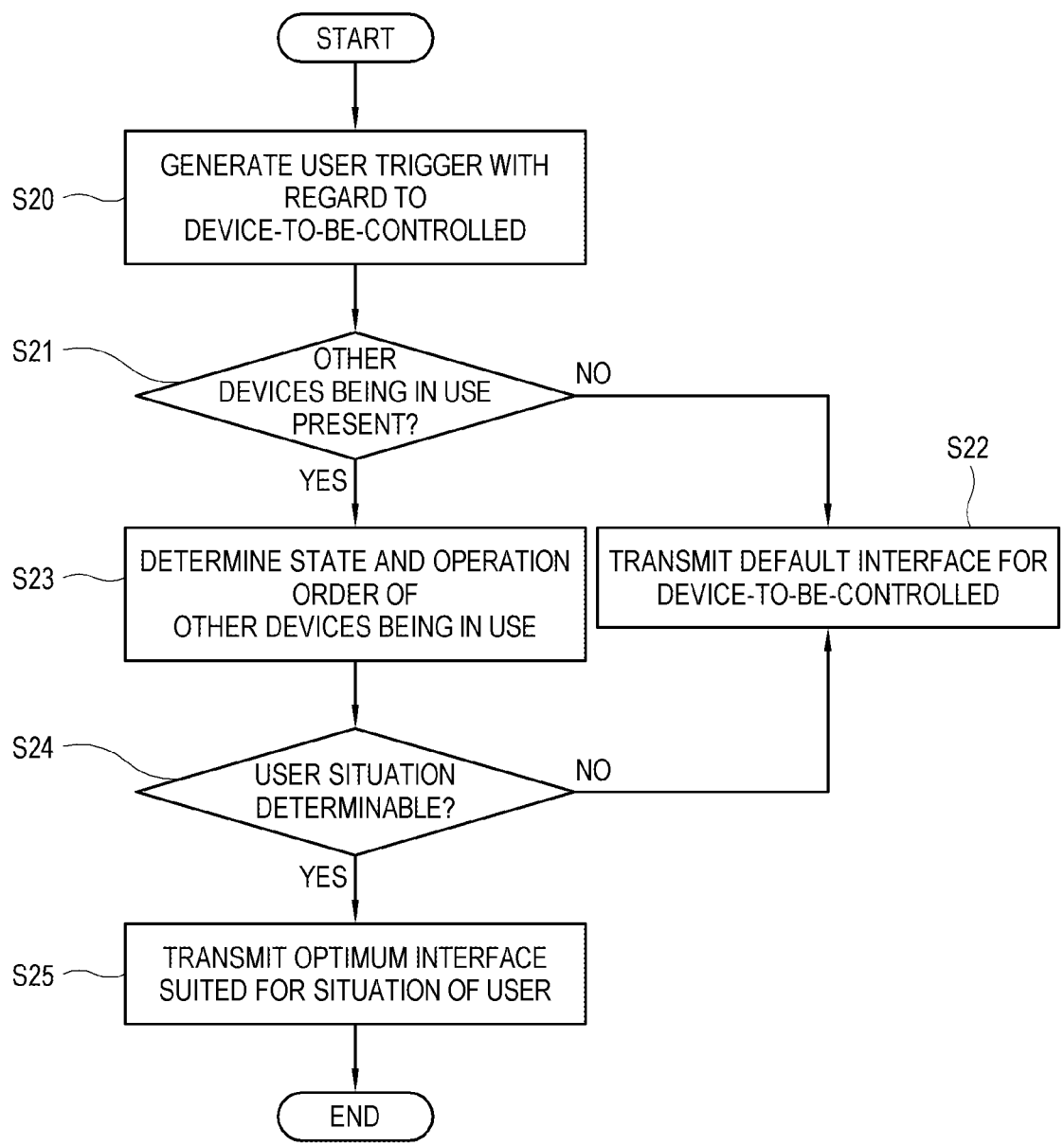
FIG. 2 is a flowchart of showing processes for providing a user interface (UI) suited for a user situation when a user trigger occurs according to one embodiment of the present invention.

FIG. 2 is a flowchart of showing processes for providing a UI suited for a user situation when a user trigger occurs according to one embodiment of the present invention. First, at operation S20, it is determined whether a user trigger occurs with regard to a device-to-be-controlled. For example, the user trigger may include a touching input or an aiming input with regard to the device-to-be-controlled. The touching input includes a user's action of touching a target device with a hand, and may be for example based on technology of a proximity sensor, fingerprint recognition, etc. The aiming input includes a user's action of pointing a target device with a hand, and may be for example based on technology of Bluetooth, Bluetooth low energy (BLE), etc.

Next, at operation S21, it is determined whether other devices being in use are present. In this case, the operation S21 may include an operation of connecting with a plurality of devices capable of communicating with the device-to-be-controlled, and receiving information about whether each device is turned on. When it is determined in the operation S21 that other devices being in use are present, the states, operation order, etc. of other devices being in use are determined at operation S23. That is, information may be received with regard to what operation each powered-on device performs, and which stage the performed operation is in.

Next, at operation S24, it is determined whether a user's situation is checkable. That is, when the states, the operation order, etc. of other devices being in use are determined in the operation S23, it is possible to determine what control function a user currently needs. When it is determined in the operation S24 that a user's situation is checkable, at operation S25 an optimum interface suited for a user's situation is transmitted. That is, when a control function currently needed for a user is determined, a UI suited for the control function is generated and transmitted to a device of the user.

When it is determined in the operation S24 that a user's situation is not checkable, at operation S22 a default interface of the device-to-be-controlled is transmitted. Meanwhile, when it is determined in the operation S21 that other devices being in use are not present, at operation S22 a default interface of the device-to-be-controlled is transmitted.

Figure 3:
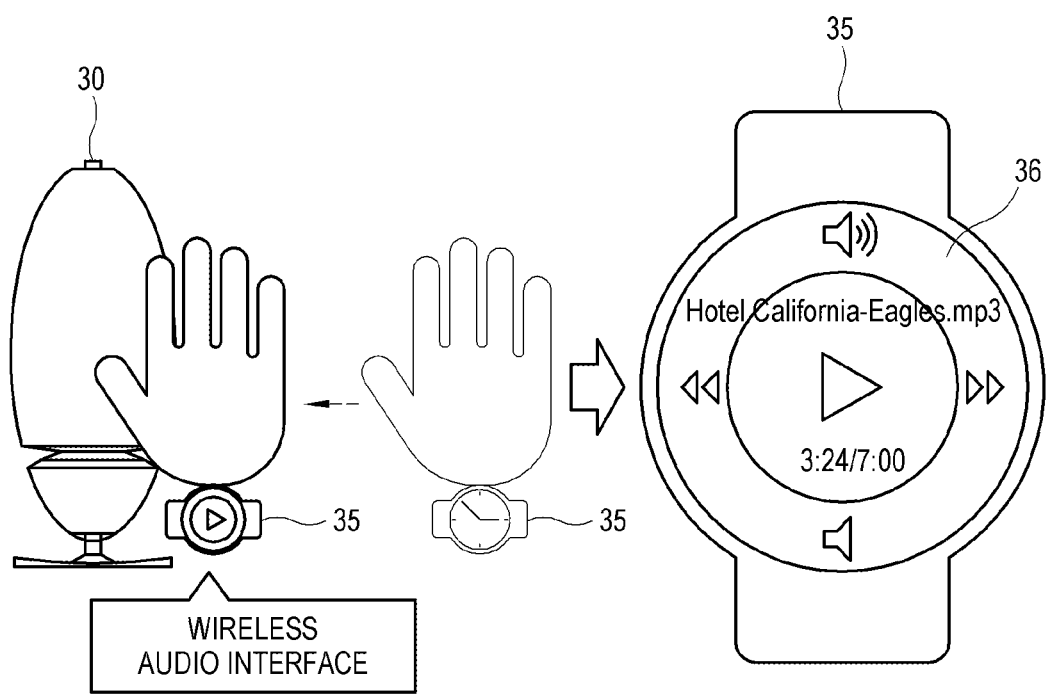

FIG. 3 illustrates an example of providing a UI for performing a control function when a user trigger occurs with regard to a device-to-be-controlled according to one embodiment of the present invention. As shown in FIG. 3, a user may make a touch input to a wireless audio system 30, and thus a request may be made for controlling the wireless audio system 30. For example, a user's touching input may be sensed by a fingerprint recognition sensor for sensing a user's fingerprint. Alternatively, a user's touching input may be sensed by Bluetooth communication or the like near field wireless communication with a smart watch 35 worn on the user.

According to one embodiment, when a user's touching input to the wireless audio system 30 is sensed, the wireless audio system 30 transmits preset information about a UI 36 to the smart watch 35 of the user, so that the user can play music through the UI 36. Alternatively, when a user's touching input to the wireless audio system 30 is sensed, the wireless audio system 30 may transmit information about the user's touching input to a home server on a home network or an external web server. In this case, the home server or the web server may transmit information about the UI 36 to the smart watch 35 of the user, with reference to previously stored information about the UI for controlling the wireless audio system 30, and previously stored information about the device of the user.

FIG. 4 illustrates an example of providing a UI for performing a control function when a user trigger occurs with regard to a device-to-be-controlled according to one embodiment of the present invention. As shown in FIG. 4, a user's touch input to the wireless audio system 30 or a user's aiming input of pointing the wireless audio system 30 may make a request for controlling the wireless audio system 30. For example, a user's touching input or aiming input may be sensed by a proximity sensor or a fingerprint recognition sensor, or may be sensed by Bluetooth communication with the smart watch 35 worn on the user.

When a user's touching input to the wireless audio system 30 is sensed, the wireless audio system 30 connects with a communicative peripheral device such as the TV 41 and thus checks that the TV 41 is powered on and is in a state of displaying a movie. Thus, the wireless audio system 30 determines that the control function a user currently needs is a function of controlling the sound of the TV 41, generates information about the UI 46 for controlling the sound of the TV 41, and transmits the generated information to the smart watch 35 of the user.

Alternatively, when a user's touching input to the wireless audio system 30 is sensed, the wireless audio system 30 may transmit information about the user's touching input to the home server on the home network. In this case, the home server is capable of communicating with all the electronic devices in the home network environments, and thus checking power supply states and operating states of all the electronic devices in the home network environments. For example, the home server may check that the TV 41 is displaying a movie, determine that the control function a user currently needs is a function of controlling the sound of the TV 41, generate information about the UI 46 corresponding to such a function, and transmit the generated information to the smart watch 35 of the user.

Figure 5:
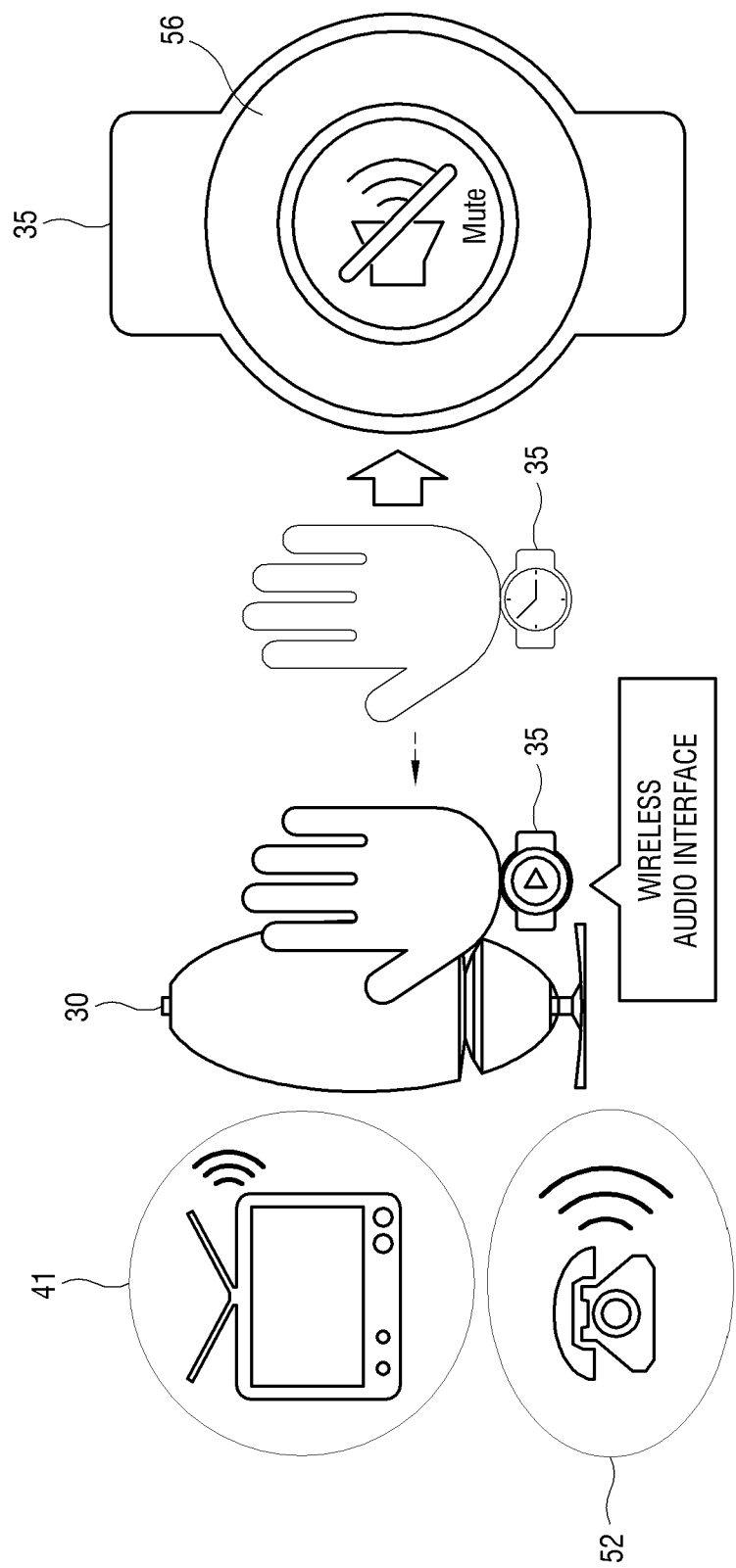

FIG. 5 illustrates an example of providing a UI for performing a control function when a user trigger occurs with regard to a device-to-be-controlled according to one embodiment of the present invention. As shown in FIG. 5, a user's touching input or aiming input to a wireless audio system 50 may make a request for controlling the wireless audio system 50. For example, a user's touching input and aiming input may be sensed by a proximity sensor or a fingerprint recognition sensor, or may be sensed by Bluetooth communication with the smart watch 35 worn on the user.

When a user's touching input to the wireless audio system 50 is sensed, the wireless audio system 50 connects with a communicative peripheral device, i.e. a TV 41 and an Internet phone 52, and determines whether the TV 41 and the Internet phone 52 are turned on and which operations the TV 41 and the Internet phone 52 are performing. According to one embodiment, when a user's touching input to the wireless audio system 50 is sensed, it may be determined that the TV is displaying a movie, and the Internet phone 52 is ringing. Thus, the wireless audio system 50 may determine that the control function a user currently needs is a function of silencing the TV 41, generate information about a UI 56 for silencing the TV 41, and transmit the generated information to the smart watch 35 of the user.

Alternatively, the wireless audio system 50 may transmit a UI (not shown) of displaying a request for a call received in the Internet phone 52 to the smart watch 35 of a user, so that the user can make a phone call on the smart watch 35. Thus, only a user' touching operation to the wireless audio system 50 is enough to receive an optimized UI in his/her device so that the peripheral device can be silenced and a phone call can be made.

According to one embodiment, a user's touching input to the wireless audio system 50 is sensed, the wireless audio system 50 may transmit information about the user's touching input to the home server of the home network. In this case, the home server is capable of communicating with all the electronic devices in the home network environments, for example, connecting with the TV 41 and the Internet phone 52 and checking that the TV 41 is displaying a movie, and the Internet phone 52 is ringing. Thus, the home server determines that the control function a user currently needs is a function of silencing the TV 41, generates information about the corresponding UI 56, and transmit the generated information to the smart watch 35 of the user.

Figure 6A:
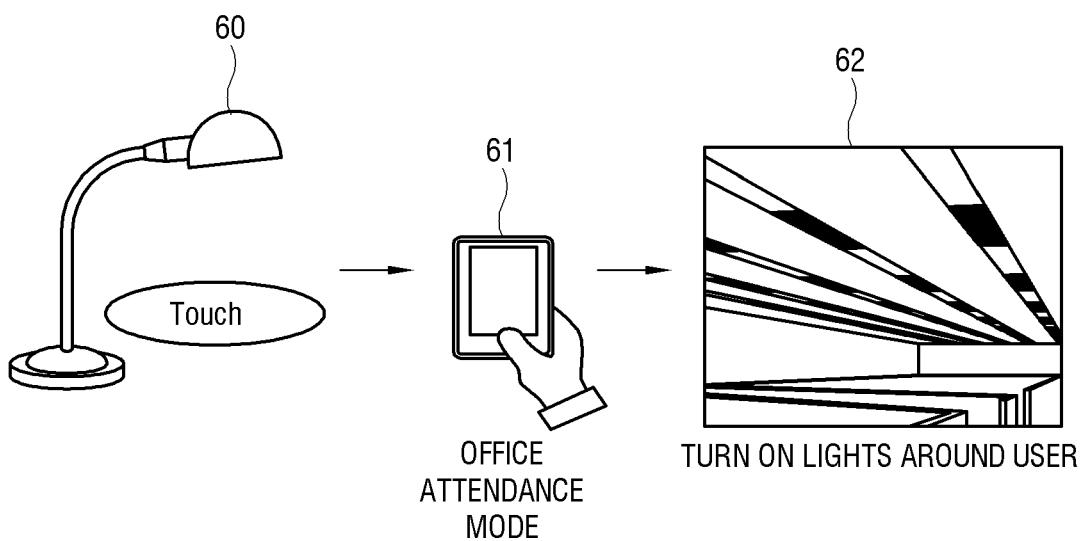
Figure 6B:
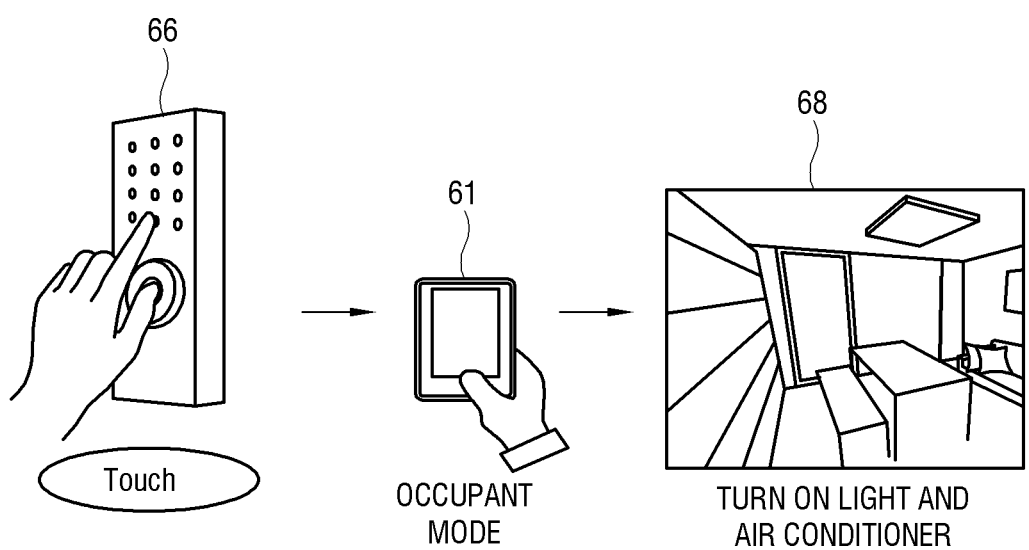

FIGS. 6A, 6B illustrate an example of providing a UI for performing a control function when a user trigger occurs with regard to a device-to-be-controlled according to one embodiment of the present invention. As shown, FIG. 6A illustrates that a UI for controlling an office attendance mode is provided to a smart phone 61 of a user when the user's touching input to a lamp 60 is made. In this case, the user may use the UI displayed on the smart phone 61 to activate the office attendance mode and turn on a light 62 around the user.

Alternatively, FIG. 6B illustrates that a UI for controlling an occupant mode is provided to a smart phone 61 of a user when the user opens a door lock 66 of a front door. In this case, the user may use the UI displayed on the smart phone 61 to activate the occupant mode and control the light and an air conditioner 68 in the user's house to be automatically turn on.

According to this embodiment, many devices within an environment that a user belongs to are selected corresponding to a situation and controlled in a lump, in response to an event for controlling a device-to-be-controlled.

FIG. 7 illustrates an example of providing a UI for performing a control function when a user trigger occurs with regard to a device-to-be-controlled according to one embodiment of the present invention. As shown in FIG. 7, in a case where the device-to-be-controlled is a display-less device, an interface about the display-less device is transmitted to a device having a display and controlled when a user's trigger occurs. For example, when a user's touching input to a refrigerator 70 is made, information about a UI capable of controlling a refrigerating temperature and a freezing temperature of the refrigerator 70 is transmitted to a smart phone 61 or a smart watch 35 of the user so that the user can control the refrigerator 70 through the smart phone 61 or smart watch 35 having the display. Alternatively, when a child makes a touching input to the refrigerator 70, a list of foods stored in a refrigerating compartment and a freezing compartment of the refrigerator 70 is transmitted to a smart phone 61 of a mother registered as a manager of the refrigerator 70, so that the mother can check the list of food and access an Internet mall to buy food materials.

Likewise, when a user makes a touching input to wireless audio system 30, an air conditioner 68 and the like display-less device, the UI is transmitted to the smart phone 61 or smart watch 35 of the user, which includes a display, so that the display-less device can be controlled.

Figure 8:
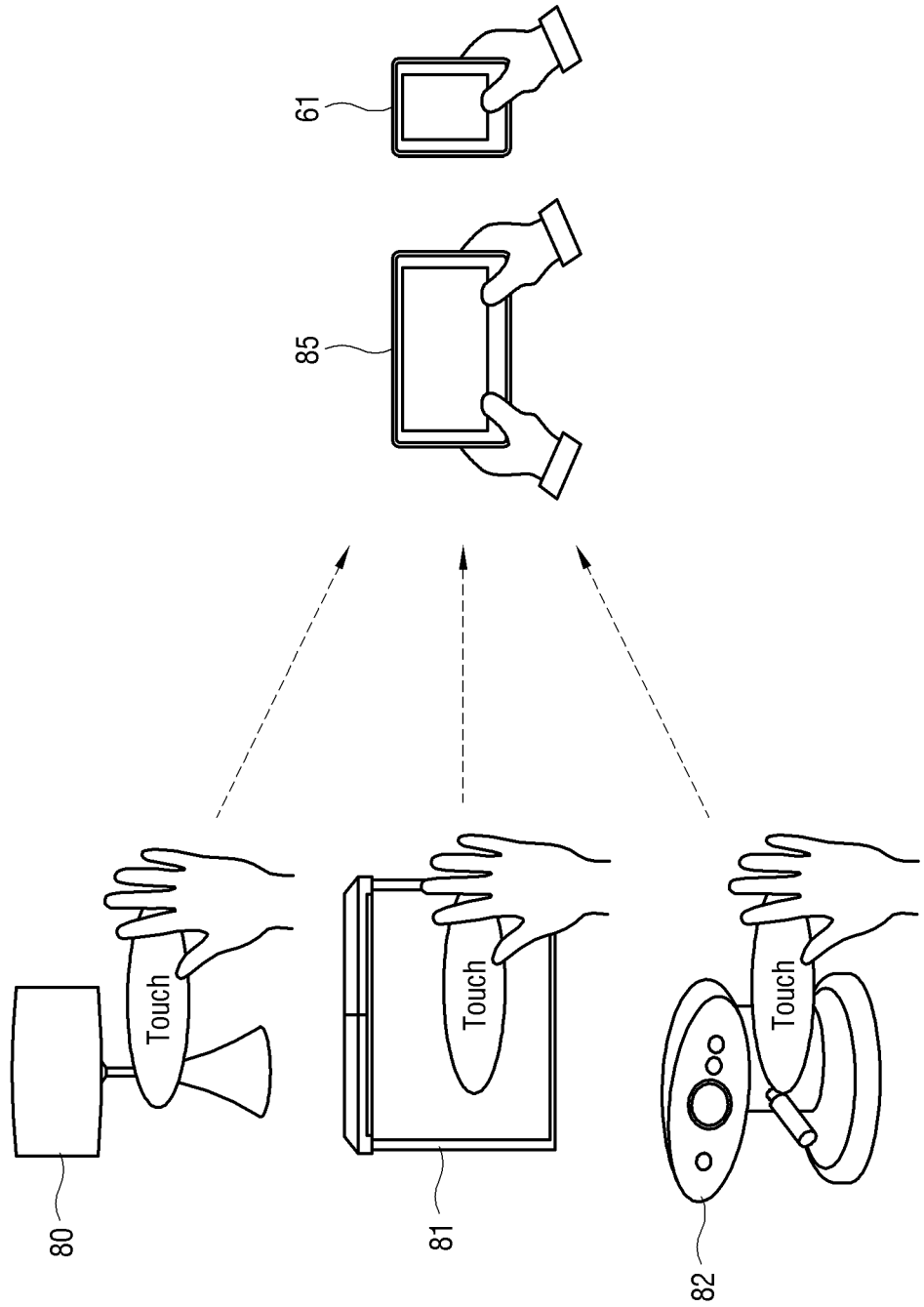

FIG. 8 illustrates an example of providing a UI for performing a control function when a user trigger occurs with regard to a device-to-be-controlled according to one embodiment of the present invention. As shown in FIG. 8, when a user touches a display-less smart light 80, a UI for controlling the color and brightness of the smart light 80 may be transmitted to a tablet computer 85 or smart phone 61 of the user. Further, a user touches a display-less kimchi refrigerator 81, a UI for controlling compartment temperatures of the kimchi refrigerator 81 may be transmitted to the tablet computer 85 or smart phone 61 of the user. Likewise, when a user touches a display-less espresso machine 82, a UI for controlling the water purification, temperature, pressure, etc. of the display-less espresso machine 82 may be transmitted to the tablet computer 85 or smart phone 61 of the user. Thus, when it is required to control the display-less device, the UI is provided to the display device of a user so that the user can control the display-less device by visual control.

Figure 9:
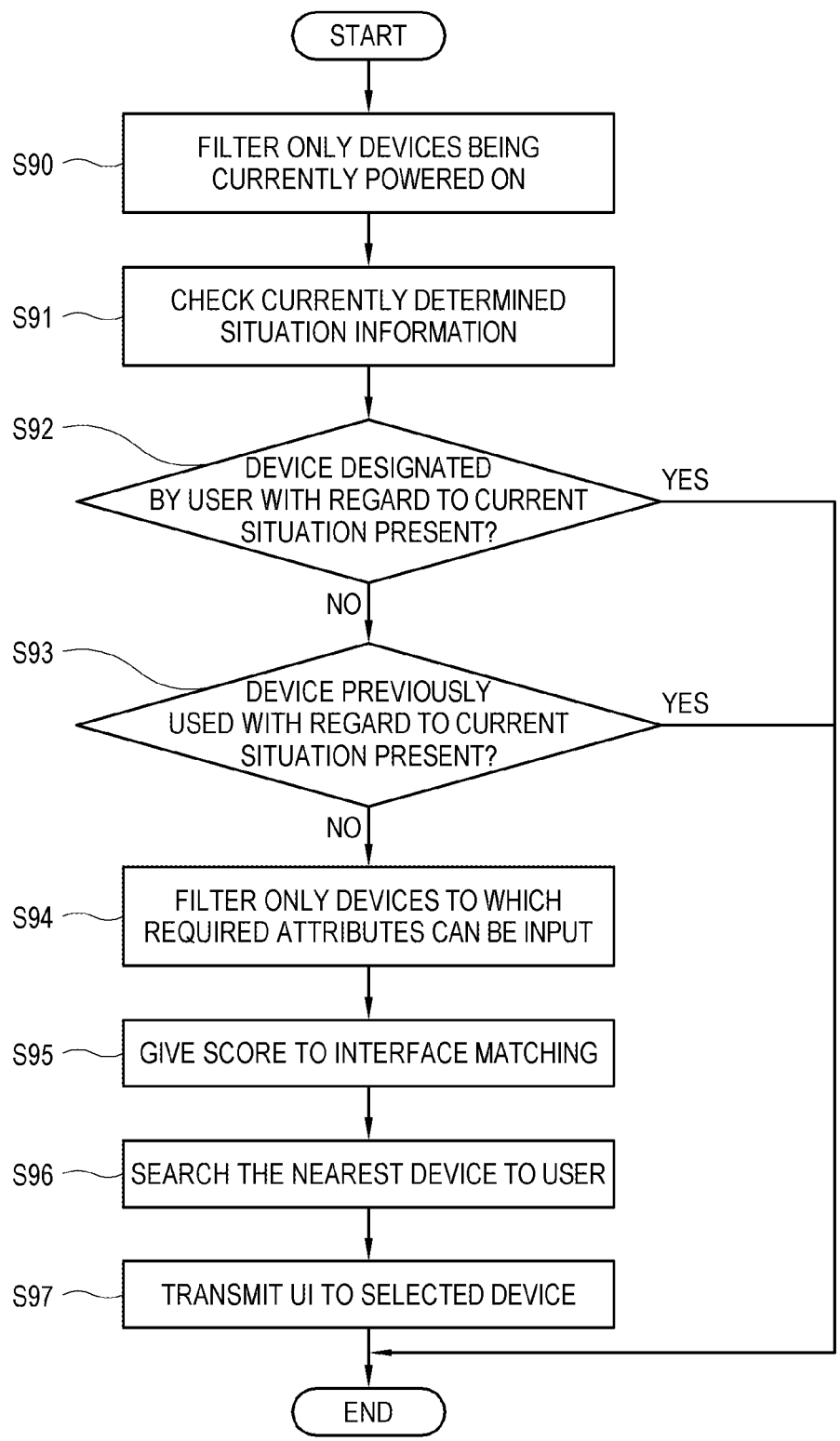
FIG. 9 is a flowchart of showing processes for selecting a device for providing a UI suited for a user situation when a user trigger occurs according to one embodiment of the present invention.

FIG. 9 is a flowchart of showing processes for selecting a device for providing a UI suited for a user situation when a user trigger occurs according to one embodiment of the present invention. As shown in FIG. 9, first, at operation S90, devices being currently powered on in a network environment are filtered. Next, at operation S91, information about currently determined situations is checked with regard to each of the powered-on devices. Here, the situation information includes information about what operation each device is performing, information about operation order of the devices, etc.

Next, at operation S92, it is determined whether there is a device designated by a user corresponding to the situation. When there is a device designated by a user, at operation S97 a UI is transmitted to the designated device of a selected user. When it is determined in the operation S92 that there are no devices designated by a user, at operation S93 it is determined whether there is a device previously used corresponding to the situation. When there is a previously used device, at operation S97 the previously used device is selected and the UI is transmitted to the selected device.

When it is determined in the operation S93 that there are no previously used devices, at operation S94 only the devices to which required attributes can be input is filtered. In this case, the attributes include a specific selection value, a text, a voice, an image, a heart rate, acceleration, etc., and the device capable of displaying such attributes is searched and selected on the network.

Next, at operation S95, interface matching is scored. That is, a score may be given with regard to whether the input of required attributes can be made through a plurality of interface tools provided by the electronic device. Based on such a given score, the devices having the interface tool, to which a high score is given, may be selected.

Next, at operation S96, the nearest device to a user is searched. In the foregoing operation S95, the nearest device to the current position of the user may be selected among the devices selected based on the interface matching. Last, at operation S97, the UI corresponding to the information about the situation is transmitted to the selected device.

According to such an embodiment of the present invention, a device optimized to display information included in the UI is selected among the plurality of devices so as to provide the UI for controlling the device-to-be-controlled.

FIG. 10 is a table in which suitability between an information attribute and an interface is scored according to one embodiment of the present invention. As shown in FIG. 10, information attributes to be included in a UI may include a specific selection value, a text, a voice, an image, a heart rate, acceleration, etc. It is taken into account whether the interfaces, such as four arrow keys, a touch screen, a mouse, a keyboard, a microphone, a camera, an accelerometer, a biometric sensor, etc. are suitable for receiving inputs of these attributes, and then the scores are given to the interfaces. Thus, among the plurality of electronic devices, the device having the interface of a highest score is selected to transmit a UI. For example, when the UI needs to have functions of inputting an image and a sound, each of a camera and a microphone is scored 100 in light of the image and the sound. Thus, a smart phone of a user may be selected as a device including both the camera and the microphone, thereby providing the UI.

Alternatively, when a UI involves a lot of lists, the UI may be provided through a tablet computer having a larger screen than a smart watch so that a user can view information on a screen as much as possible at a time.

FIG. 11 illustrates an example of providing a UI by taking priority of users into account when a user trigger occurs according to one embodiment of the present invention. As shown in FIG. 11, when a first user touches a washing machine 110, a UI for controlling the washing machine 110 may be provided to not only the smart watch 111 of the first user but also a tablet computer 112 of a second user who has higher priority than the first user, with reference to information about priority over the washing machine 110, which is previously stored in a server or the washing machine.

Alternatively, when the first user touches a washing machine 110, a UI 113 for controlling operations of the washing machine 110 may be transmitted to the smart watch 111 of the first user. In this case, when the first user is for example an old man or a child who cannot use the UI 113 in controlling the washing machine 110, the washing machine 110 may provide a UI 114 to the tablet computer 112 of the second user registered as a manager having a higher priority than the first user, with reference to the previously registered information about the priority. Further, the UI 114 provided to the tablet computer 112 of the second user may be different in form from the UI 113 provided to the smart watch 111 of the first user so that the UI 114 can be displayed as a form suited for the characteristics of the device.

According to one embodiment, in the state that the UI 113 and the UI 114 are respectively provided to the smart watch 111 of the first user and the tablet computer 112 of the second user, a program for communication, a chatting application or the like may be executed in the smart watch 111 and the tablet computer 112 so that the first user and the second user can have a talk or a chat with each other about the control or the like of the washing machine 110.

Figure 12:
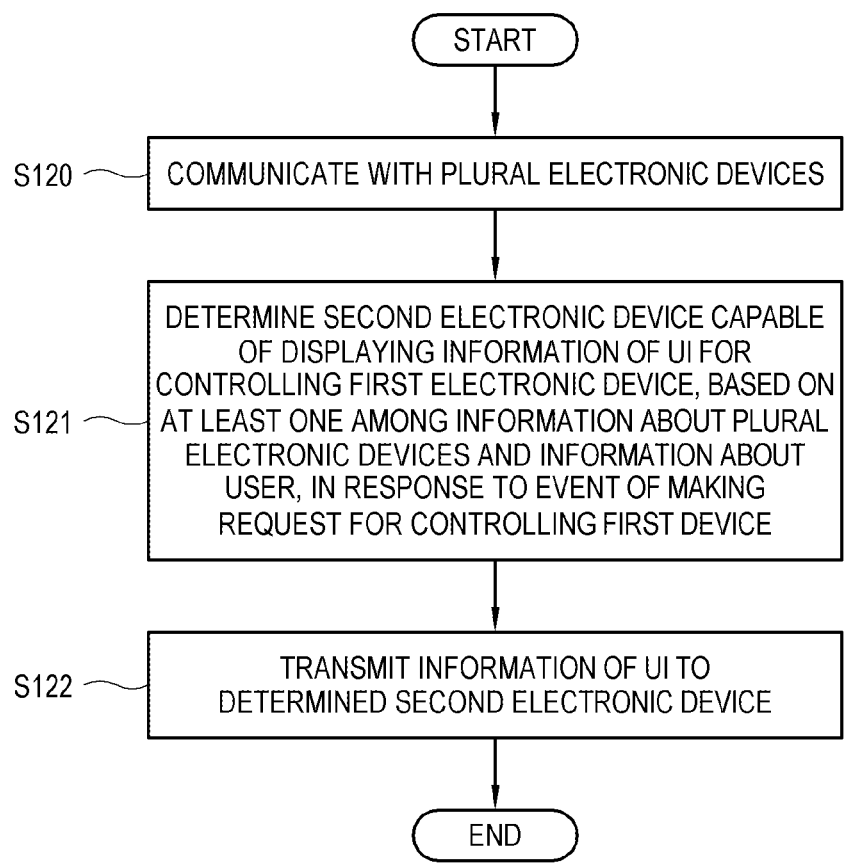
FIG. 12 is a flowchart of showing a control method of an electronic apparatus according to one embodiment of the present invention.

FIG. 12 is a flowchart of showing a control method of an electronic apparatus according to one embodiment of the present invention. As shown in FIG. 12, first, at operation S120, communication with the plurality of electronic devices is performed. Next, at operation S121, the second electronic device capable of displaying information about the UI for controlling the electronic device is determined, based on at least one of information about the plurality of electronic devices and information about a user, in response to an event for making a request for controlling the first electronic device. The event may include the user's touching input or aiming input to the first electronic device. The information about the plurality of electronic devices may include information about each power supply state and operating state of the plurality of electronic devices. The information about the UI may include a UI controllable by a user to perform the determined control function.

According to one embodiment, the operation S121 may include an operation of giving a score in accordance with a matching degree between each of the plurality of electronic devices and the information of the UI, and an operation of selecting the second electronic device, the score of which is equal to or higher than a predetermined level, among the plurality of electronic devices.

Last, at operation S122, information about the UI is transmitted to the determined second electronic device. According to one embodiment, an operation may be included to store information about priority of users over each of the plurality of electronic apparatuses, and an operation may be included to transmit information about a UI to each terminal of the first user who generates an event and the second user who has a higher priority than the first user, based on the stored information about the priority of users of the first electronic device, in response to the event of making a request for controlling the first electronic device among the plurality of electronic devices. Further, an operation may be included to control a program for communication between the first user and the second user to be executed in each terminal of the first user and the second user.

According to one embodiment, an operation may be included to store information about the plurality of electronic devices in response to the event, information about the user of the first electronic device, the determined control function, the information about the UI, the information about the second electronic device, etc. and an operation may be included to refer to the stored invention when a new event occurs.

Figure 13:
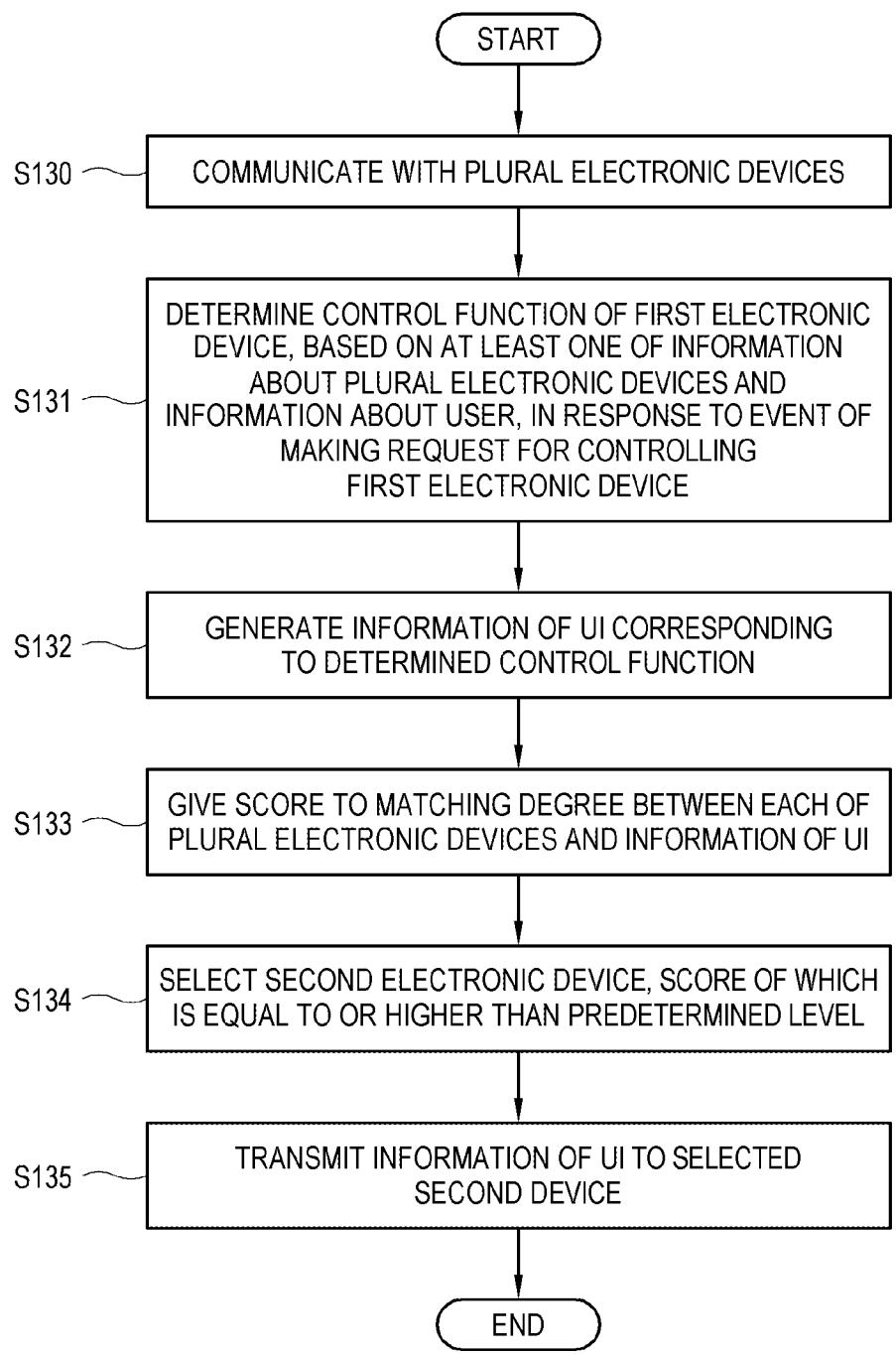
FIG. 13 is a flowchart of showing a control method of an electronic apparatus according to one embodiment of the present invention.

FIG. 13 is a flowchart of showing a control method of an electronic apparatus according to one embodiment of the present invention. As shown in FIG. 13, first, at operation S130, communication with the plurality of electronic devices is performed. Next, at operation S131, a control function of the first electronic device is determined based on at least one of information about the plurality of electronic devices and information about a user in response to an event of making a request for controlling the first electronic device.

Next, at operation S132 information about a UI is generated corresponding to the determined control function, and at operation S133 a score is given in accordance with a matching degree between the plurality of electronic devices and the information of the UI. Next, at operation S134, the second electronic device, the score of which is equal to or higher than a predetermined level, is selected. Last, at operation S135, the information of the UI is transmitted to the selected second electronic device.

According to such an embodiment of the present invention, states of a user and peripheral devices are taken into account, to thereby automatically provide a UI for a control function needed for a user. Further, in light of providing a UI, a device optimized to display information involved in the UI is selected among the plurality of devices.

Although preferred embodiments of the present invention are described in detail, the present invention is not limited to these embodiment and various changes can be made without departing from the scope defined the appended claims.

The invention claimed is:

1. An electronic apparatus comprising:
   a communicator configured to communicate with a first electronic device and a plurality of second electronic devices; and
   a controller configured to:
      identify a second electronic device capable of displaying a user interface (UI) for controlling the first electronic device from among the plurality of second electronic devices, based on at least one of information about the plurality of second electronic devices or information about a user, in response to an event of the user which makes a request for controlling the first electronic device, and control the identified second electronic device to display the UI.

2. The electronic apparatus according to claim 1, wherein the controller determines a control function of the first electronic device based on the at least one of the information about the plurality of second electronic devices or the information about the user, and generates the UI corresponding to the determined control function.

3. The electronic apparatus according to claim 2, wherein the UI comprises a UI controllable by the user to perform the determined control function.

4. The electronic apparatus according to claim 2, wherein the controller stores the information about the plurality of second electronic devices corresponding to the event, the information about the user of the first electronic device, the determined control function, information of the UI, and information about the identified second electronic device, and refers to the stored information when a new event occurs.

5. The electronic apparatus according to claim 1, wherein the controller gives a score in accordance with a matching degree between each of the plurality of second electronic devices and the UI, and selects the second electronic device, the score of which is equal to or higher than a predetermined level, from among the plurality of second electronic devices.

6. The electronic apparatus according to claim 1, further comprising a storage configured to store information about priority of users of each of the plurality of second electronic devices, wherein the controller controls the communicator to transmit information of the UI to a device of a first user who generates the event and a device of a second user who has a higher priority than the first user, based on the stored information about the priority of the users with respect to of the first electronic device, and wherein the device of the first user and the device of the second user are included in the plurality of second electronic devices.

7. The electronic apparatus according to claim 6, wherein the controller controls a program for communication between the first user and the second user to be executed in the device of the first user and the device of the second user.

8. The electronic apparatus according to claim 1, wherein the event comprises a touching input or an aiming input of the user to the first electronic device.

9. The electronic apparatus according to claim 1, wherein the information about the plurality of second electronic devices comprises information about whether power is supplied to the plurality of second electronic devices and what operation the plurality of second electronic devices is performing.

10. The electronic apparatus according to claim 1, wherein the plurality of second electronic devices comprise a portable terminal and a wearable device for the user.

11. A method comprising:

communicating with a first electronic device and a plurality of second electronic devices;

identifying a second electronic device capable of displaying a user interface (UI) for controlling the first electronic device from among the plurality of second electronic devices, based on at least one of information about the plurality of second electronic devices or information about a user, in response to an event of the user which makes a request for controlling the first electronic device; and controlling the identified second electronic device to display the UI.

12. The method according to claim 11, further comprising:

determining a control function of the first electronic device based on the at least one of the information about the plurality of second electronic devices or the information about the user; and generating the UI corresponding to the determined control function.

13. The method according to claim 12, wherein the UI comprises the UI controllable by the user to perform the determined control function.

14. The method according to claim 12, further comprising:

storing the information about the plurality of second electronic devices corresponding to the event, the information about the user of the first electronic device, the determined control function, information of the UI, and information about the identified second electronic device; and referring to the stored information when a new event occurs.

15. The method according to claim 11, wherein the identifying of the second electronic device comprises:

giving a score in accordance with a matching degree between each of the plurality of second electronic devices and the UI; and selecting the second electronic device, the score of which is equal to or higher than a predetermined level, from among the plurality of second electronic devices.

16. The method according to claim 11, further comprising:

storing information about priority of users of each of the plurality of second electronic devices; and transmitting information of the UI to a device of a first user who generates the event and a device of a second user who has a higher priority than the first user, based on the stored information about the priority of the users with respect to the first electronic device, wherein the device of the first user and the device of the second user are included in the plurality of second electronic devices.

17. The method according to claim 16, further comprising controlling a program for communication between the first user and the second user to be executed in the device of the first user and the device of the second user.

18. The method according to claim 11, wherein the event comprises a touching input or an aiming input of the user to the first electronic device.

19. The method according to claim 11, wherein the information about the plurality of second electronic devices comprises information about whether power is supplied to the plurality of second electronic devices and what operation the plurality of second electronic devices is performing.

20. The method according to claim 11, wherein the plurality of second electronic devices comprise a portable terminal and a wearable device for the user.

* * * * *